United States Patent [19]

Gawryk, Sr.

[11] 4,116,576
[45] Sep. 26, 1978

[54] CUTTING INSERT
[75] Inventor: William C. Gawryk, Sr., Allegheny County, Pa.
[73] Assignee: Newcomer Products, Inc., Latrobe, Pa.
[21] Appl. No.: 790,175
[22] Filed: Apr. 25, 1977
[51] Int. Cl.² ............................................. B26D 1/00
[52] U.S. Cl. .................................... 407/114; 407/115
[58] Field of Search ................................ 407/114, 115
[56] References Cited
U.S. PATENT DOCUMENTS

| 3,137,917 | 6/1964 | Dowd | 407/114 |
|---|---|---|---|
| 3,187,406 | 6/1965 | Franko | 407/114 |
| 3,733,664 | 5/1973 | McKelvey | 407/114 |
| 3,947,937 | 4/1976 | Hertel | 407/114 |
| 3,973,307 | 8/1976 | McCreery et al. | 407/114 |

FOREIGN PATENT DOCUMENTS 1,517,204  2/1968  France ..................................... 407/114

OTHER PUBLICATIONS

Holland Printed Application #7,300,644, Jul. 1974.

Primary Examiner—Leonidas Vlachos
Attorney, Agent, or Firm—Buell, Blenko & Ziesenheim

[57] ABSTRACT

A cutting insert for controlling the removal of metal from a workpiece. A cutting edge of the insert is formed by the intersection of a peripheral wall surface with a raised land planar surface. A first curved portion adjoins the land surface and a descending wall surface. A second curved portion adjoins the descending wall surface and a lower planar surface substantially parallel to the land surface.

7 Claims, 5 Drawing Figures

CUTTING INSERT

The invention relates to cutting inserts useful in the metal working field.

Machining operations involving the removal of metal from the surface of a rotating workpiece by a cutting tool generates a "chip" which must be continuously broken and removed. If a chip is not broken, long dangerous strings of hot metal flail in the air as the workpiece rotates. Originally the art provided chip grooves or other mechanical projections to interfere with the free flow path of a growing chip string. The chip would strike the projection in its path and break off. Such chip control devices unnecessarily consume horsepower. Later it was found that the chip flow could be controlled by the surface of the cutting tool. A chip can be made to flow over a raised land and down a wall to a lower planar surface and caused to form a curl. After the curl is formed the chip naturally breaks off without striking a projection. U.S. Pat. No. 3,973,307, issued Aug. 10, 1976 to James F. McCreery et al., is illustrative of the art. Power loading is a function of the friction of the chip sliding over the cutting tool surfaces and also of the impact of the chip striking the rotating workpiece.

I have found that chip flow can be controlled by a unique surface design to minimize surface contact. This significantly lowers the horsepower requirements or increases the cutting rate. I provide a cutting tool insert having a peripheral wall surface, a raised planar land surface intersecting the peripheral wall surface, a cutting edge formed by the intersection of the peripheral wall surface and the planar surface, a first curved surface having a radius of from 0.006 to 0.018 inches adjoining the land surface, an inner wall surface descending from the first curved surface inwardly of the peripheral wall surface, a second curved surface descending from the wall surface and having a radius of from 0.006 to 0.018 inches, and a lower planar surface adjoining the second curved surface and parallel to the planar land surface. I have found that these surfaces are less likely to erode and chip than the inserts presently available in the art.

Other details, objects and advantages of the invention will become apparent as the following description of a present preferred embodiment thereof proceeds.

In the accompanying drawings, I have shown a present preferred embodiment of the invention in which.

Figure 1:
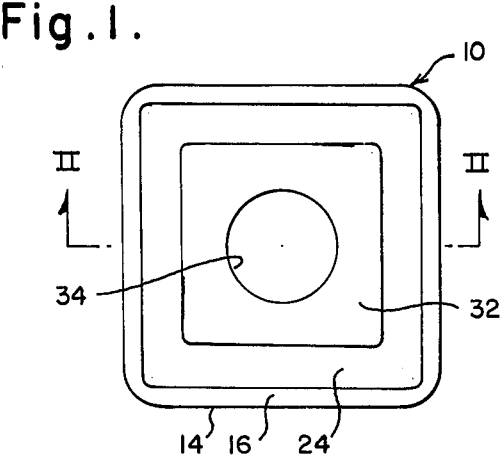
FIG. 1 is a plan view of a cutting insert embodying my invention.
Figure 2:
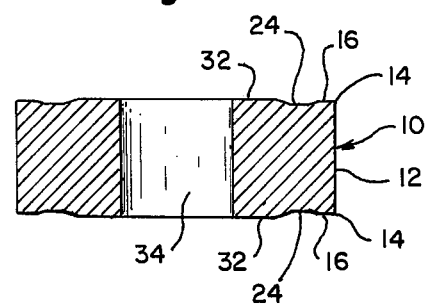
FIG. 2 is a side sectional view along II—II of FIG. 1.

FIG. 1 generally depicts a square cutting insert 10. Inserts are also commonly provided in other polygonal shapes, including triangles and diamonds, or in circular shapes and are made from hard wear-resistant materials, such as cemented metal carbides. As will be seen in FIG. 1, insert 10 has cutting edge 14 formed by the intersection of peripheral sidewall surface 12 with raised planar land surface 16. I prefer to provide insert 10 having a cutting edge along the four peripheral sides of cutting insert 10. Also, as indicated in FIG. 2, I provide cutting edges on both the top and bottom surfaces of insert 10.

Figure 3:
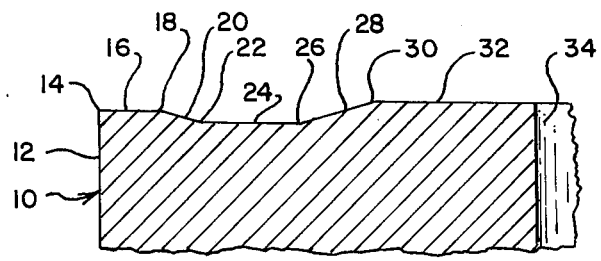
FIG. 3 is an enlarged partial view of FIG. 2.

Referring to FIG. 3, raised planar land surface 16 extends inwardly and perpendicularly of cutting edge 14 to curved surface 18. First curved surface 18 has a radius of from 0.006 to 0.018 inches and adjoins inner wall surface 20 which descends inwardly of peripheral wall 12. Inner wall surface 20 descends from first curved surface 18 at an angle of 6° to 30° relative to land area 16 and adjoins second curved surface 22. Second curved surface also has a radius of from 0.006 to 0.018 inches, although I usually prefer to provide the same radius of curvature for the first and second curved surfaces (18 and 22). Second curved surface 22 adjoins lower planar surface 24 which is parallel to land surface 16. Planar surface 24 extends inwardly of peripheral surface 12 to third curved surface 26 which also has a radius of curvature of from about 0.006 to 0.018 inches. Third curved surface 26 adjoins rear wall surface 28 ascending inwardly of peripheral wall surface 12 at an angle of 150° to 174° with lower planar surface 24. Ascending wall surface 28 adjoins surface 30 which in turn adjoins island surface 32 surrounding center hole 34.

Figure 5:
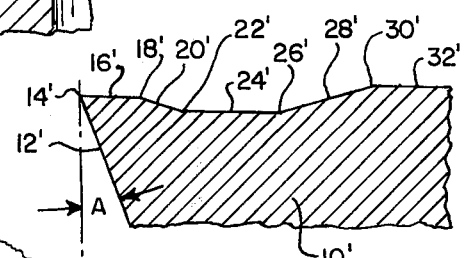
FIG. 5 is a side sectional view of a cutting insert embodying my invention having a positive rake angle.

FIG. 3 implies that cutting edges 14 is formed by the perpendicular intersection of peripheral surface 12 and land area 16. The invention may also be advantageously utilized in the embodiment illustrated in FIG. 5 in which insert 10' has a positive rake angle "A" of from about 6° to 15°. Cutting edge 14' is formed at the intersection of peripheral sidewall 12' and land area 16' at an angle of from about 75° to 84°. Rake angle "A" permits cutting edge 14' to engage the workpiece above its centerline. Rotation of the surface of the workpiece from above land surface 16' toward insert 10' urges cutting edge 14' and land surface 16' downwardly toward the centerline.

Figure 4:
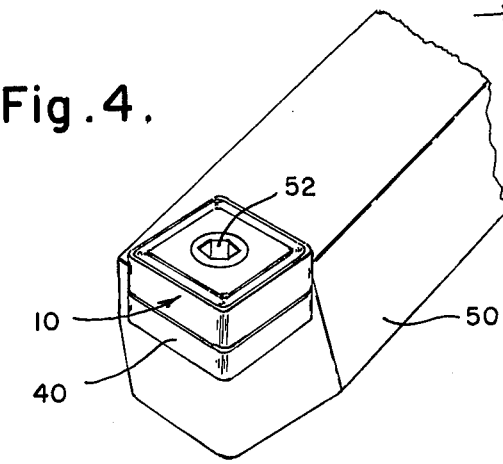
FIG. 4 illustrates a cutting insert mounted on a tool holder.

As seen in FIG. 4, insert 10 rests upon base 40 which is designed to support insert 10 and to protect the cutting edges on the lower face of the insert. Insert 10 on its base is fastened to a tool holder 50 by, e.g., a bolt 52 or the like which fits through hole 34 and a hole in the base and is tightened by a nut under tool holder 50. In use cutting edge 14 is forced against the side of the peripheral surface of a rotating workpiece to remove metal chips. These metal chips flow over land 16, first curved surface 18, descending inner wall surface 20, second curved surface 22 and along lower planar surface 24. The metal chips naturally curl and then snap off under normal operating conditions. The combination of surfaces presents a minimal surface to control the free flow of the metal chips. The combination, including the first 18 and second 22 curved surfaces, of surfaces does not chip out, break away or otherwise erode under the pressure of the flowing chips.

At very high feed rates, chips tend to string out rather than to curl and break off. These chips follow lower planar surface 24, third curved surface 26 and rear wall surface 28 and break off. The horsepower consumed at high feed rates is less than the power which would be required with the inserts presently available.

I have tested an insert embodying my invention with other similarly shaped inserts now available in the art. I compared a square insert having a length of one inch along a peripheral wall, a land width of 0.036 inches, a total width between land surface 16 and island surface 32 of 0.140 inches (including lower a plane width of 0.072 inches) and an island surface width of about 0.324 inches with other one inch square inserts recommended for use in the particular application.

EXAMPLE I 4140 steel forgings (250–320 Brinell Hardness Number), (BHN), having dimensions of 77 inch OD. by 67 inch length were rough cut in two cuts of ¾ inch depth. The surface speeds of the workpieces were 170 surface feet per minute (SFPM) and the feed rates were 0.062 inches per revolution (IPR). Eight edges of two inserts embodying my invention were required to complete the operation and 104–105 amps on a 150 amp scale were drawn in the operation. Chip failure was due to chipping and edge wear.

In contrast, a competitor's product (marked with aforementioned U.S. Pat. No. 3,973,307) would not even break the chips and drew 140 amps on a 150 amp scale. Also, thirty two edges of eight inserts were required to complete the operation; failure of the inserts was due to breakage. A second competitor's insert gave equivalent results.

Thus an insert embodying my invention requires only 75% of the amperage of two competing inserts of similar size in the same service.

EXAMPLE II 8620 as forged steel (280 BHN) 40 inch diameter rolls were rough turned. A ¾ inch depth cut was to be made over a length of 84 inches.

Two edges of one insert embodying my invention required about 94% of the rated horsepower to remove the metal at a rate of 0.062 IPR from a roll turning at 240 SFPM.

In contrast, four edges of a competitor's similar insert required 85% of the rated power to perform the operation at 0.031 IPR.

Thus a cut at twice the speed using my improved insert required only about 10% more power and developed only one half the tool wear.

EXAMPLE III 4140 high temper steel (320 BHN) 36 inch diameter by 86 inch length were rough turned to form a neck. The rolls were turned at 210 SFPM and a 41 inch length was cut to a depth of ⅝–¾ inch in one pass. Three inserts embodying my invention were fed at 0.042 to 0.062 IPR and required 80% to 100% of the rate horsepower to complete the operation.

Eleven similarly shaped inserts commonly used in this application were required to complete one neck. These inserts were fed at a rate of only 0.028 IPR and required 80% to 100% of the rated horsepower to complete the same operation.

Thus at approximately the same horsepower, only three inserts embodying my invention completed the operation in about one half the time required by eleven inserts commonly used in the application. Only one edge of each insert was used in each case because of indexing problems.

EXAMPLE IV

I have found that other shapes, such as diamonds, embodying my invention also realize improved results. 80° diamonds having ¾ inch sides, a 0.015 inch land surface width, and a total width between curved surface 18 and island surface 32 of about 0.115 inches, including a planar surface 24 width of about 0.030 inches, were compared with diamonds of the same side dimension in the same operation. 1085 steel (275 BHN) workpieces having 10-1/2 inch diameter were to be rough cut ¼–5/16 inches along an 8 inch length. The high surface speed (720 SFPM) required the use of a coolant.

The insert embodying my invention was fed at 0.042 IPR and cut 104 pieces per insert, consuming 52–60% of the rated power in the process.

The diamond inserts commonly used in this application were fed at only 0.018 IPR and cut only 84 pieces per insert, consumming 40–48% of the rated power.

Thus inserts embodying my invention required only about 10% more power and cut more than twice as fast as the standard tool.

While I have shown and described a present preferred embodiment of my invention, it is to be distinctly understood that the invention is not limited thereto but may be otherwise variously embodied within the scope of the following claims.

I claim:

1. A cutting insert for controlling the removal of metal from a workpiece having:
    (a) a peripheral wall surface;
    (b) a planar land surface intersecting the peripheral wall surface;
    (c) a cutting edge formed by the intersection of the peripheral wall and the planar surface;
    (d) a first curved surface having a radius of from 0.006 to 0.018 inches adjoining and extending from the planar land surface;
    (e) an inner wall surface descending from the first curved surface inwardly of the peripheral wall surface;
    (f) a second curved surface descending from the inner wall surface and having a radius of from 0.006 to 0.018 inches; and
    (g) a lower planar surface parallel to the planar land surface and adjoining and extending from the second curved surface thereby forming one continuous surface within the insert cutting edge.

2. The cutting insert of claim 1 wherein the planar land surface perpendicularly intersects the peripheral wall surface.

3. The cutting insert of claim 2 wherein the planar land surface is from 0.003 to 0.015 inches above the lower planar surface.

4. The cutting insert of claim 2 wherein the radius of the first curved surface equals the radius of the second curved surface.

5. The cutting insert of claim 3 wherein the inner wall surface descends at an angle of from 6° to 30° from the plane of the land surface.

6. The cutting insert of claim 1 wherein the planar land surface intersects the peripheral wall surface at an angle of from about 75° to 84°.

7. The cutting insert of claim 1 further comprising:
    (h) a third curved surface having a radius of from 0.006 to 0.018 ascending from the lower planar surface; and
    (i) a rear wall surface adjoining the third curved surface and ascending inwardly of the peripheral wall surface at an angle of about 150° to 174° from the lower planar surface.

* * * * *